No. 740,687. PATENTED OCT. 6, 1903.
A. O'CONNOR.
SEEDING MACHINE.
APPLICATION FILED MAR. 9, 1903.
NO MODEL. 2 SHEETS—SHEET 2.
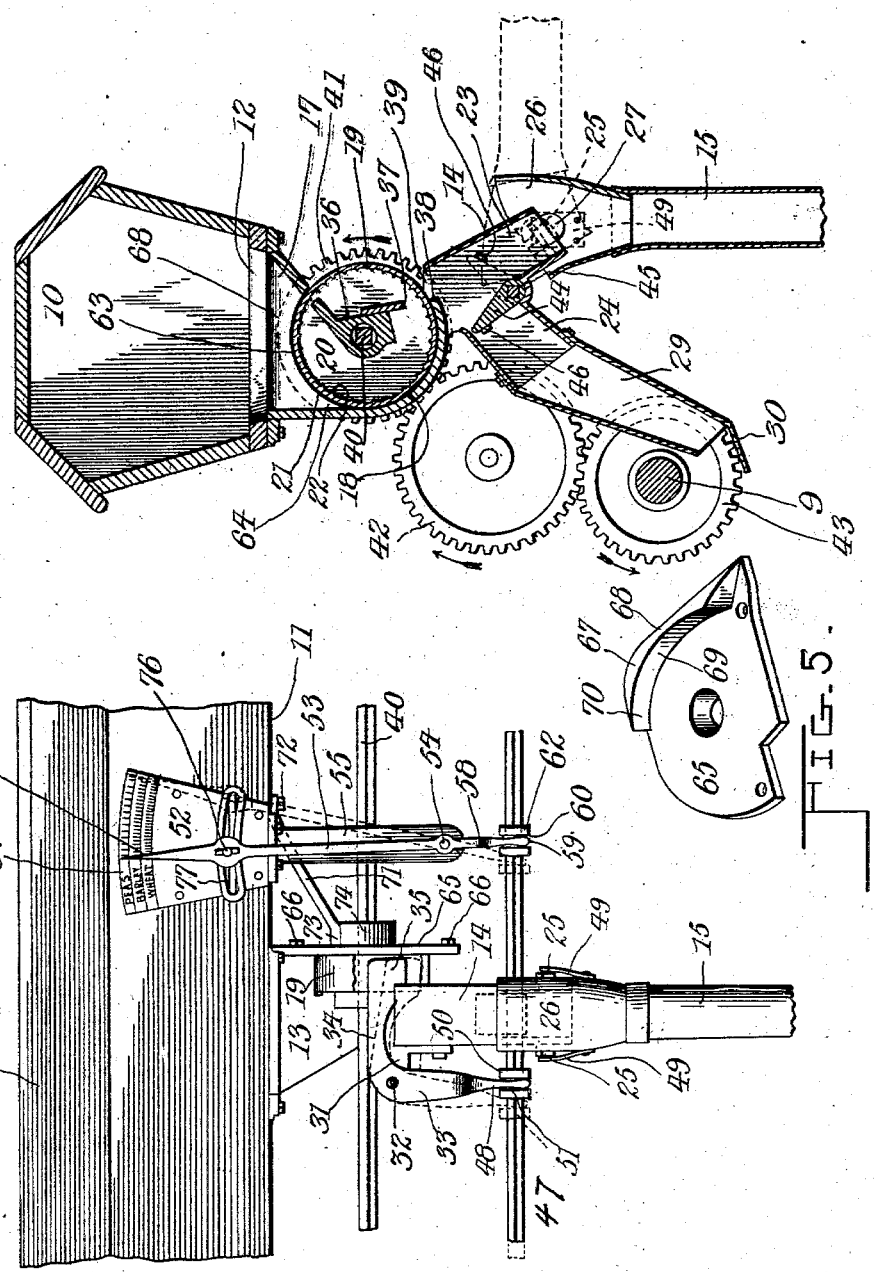
Witnesses:
Albert O'Connor Inventor,
By Marion & Marion
Attorneys No. 740,637.	Patented October 6, 1903.

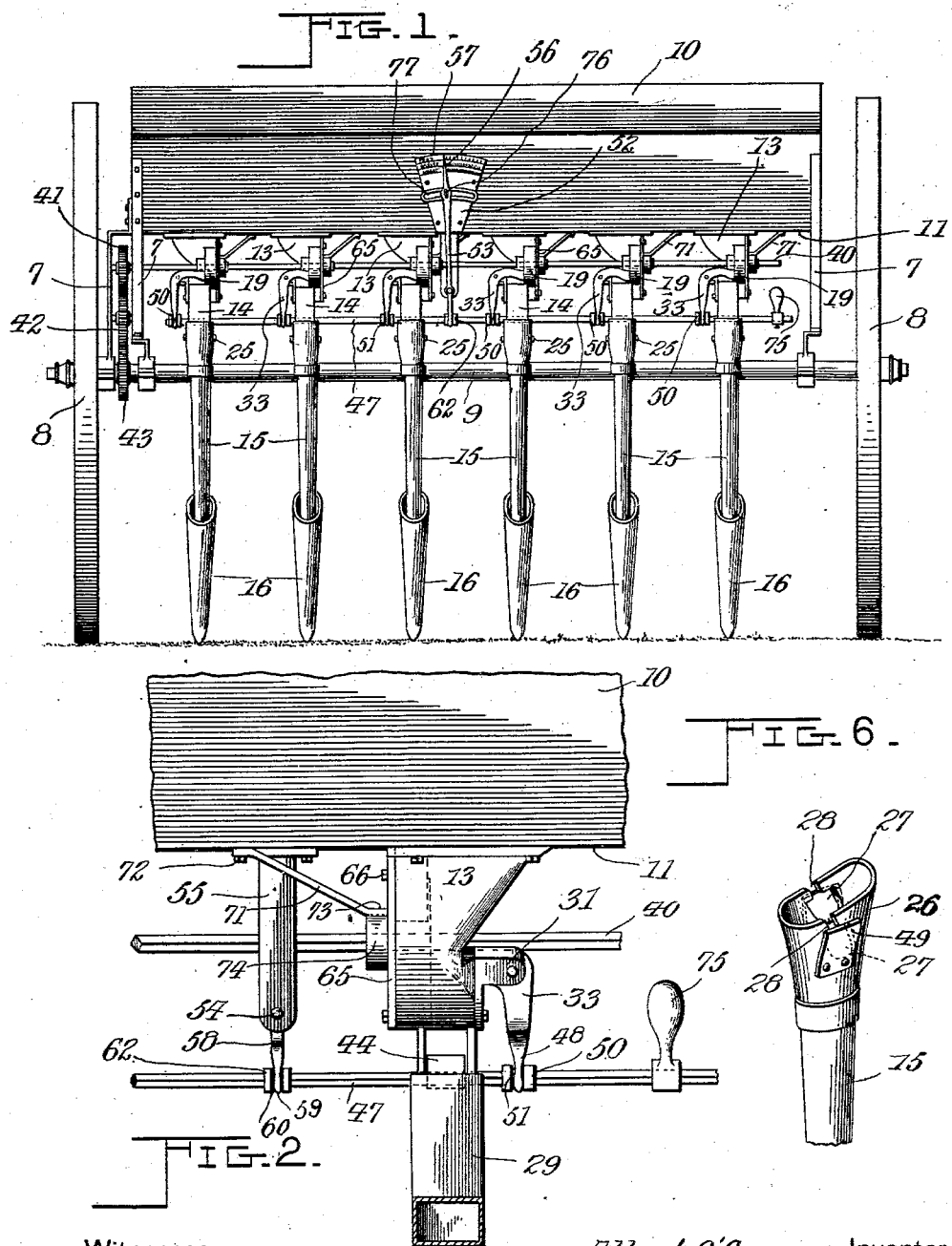

UNITED STATES PATENT OFFICE.

ALBERT O'CONNOR, OF ENNISMORE, CANADA.

SEEDING-MACHINE.

SPECIFICATION forming part of Letters Patent No. 740,687, dated October 6, 1903.

Application filed March 9, 1903. Serial No. 146,819. (No model.)

*To all whom it may concern:*

Be it known that I, ALBERT O'CONNOR, a subject of the King of Great Britain, residing at Ennismore, county of Peterboro, Province of Ontario, Canada, have invented certain new and useful Improvements in Seeding-Machines; and I do hereby declare that the following is a full, clear, and exact description of the invention, such as will enable others skilled in the art to which it appertains to make and use the same.

My invention relates to seed-drills or planters which comprise automatic feeding mechanism; and my object is to provide an improved construction whereby the amount of seed fed may be controlled in a simple manner.

A further object has been to so construct the parts as to facilitate an overhauling of the mechanism in case certain parts have become clogged, as they sometimes do.

The invention consists in the construction and combination of parts to be more fully described hereinafter, and definitely set forth in the claims.

In the drawings, which fully illustrate my invention, Figure 1 is a front elevation of a multiple drill which is provided with my invention. Fig. 2 is an enlarged rear elevation of a portion of the implement, a part being shown in section, as will appear. Fig. 3 is an enlarged front elevation of a portion of the drill, certain parts being broken away, as will appear. Fig. 4 is a vertical section passing through the feeding mechanism. Fig. 5 represents in perspective a plate or cover constituting part of the feed mechanism. Fig. 6 represents in perspective the upper portion of one of the seed-tubes, illustrating especially the means of attaching the same.

Throughout the drawings and specification the same numerals of reference denote like parts.

Referring more particularly to the parts, 7 represents a light frame supported upon wheels 8 and a transverse axle or shaft 9. This frame 7 supports a seedbox 10, which extends continuously transversely of the implement and is preferably of the form shown.
Its bottom 11 is provided with a plurality of openings 12, beneath which are carried a plurality of feed boxes or cups 13, which are bolted to the lower side of the bottom 11, as indicated. Below each feed-box there is provided a chute 14, into which the seed is discharged from each of the aforesaid feed-boxes. In connection with these chutes there are a plurality of seed conductors or tubes 15, which are adapted to deliver seed into the drills 16, which receive their lower extremities.

One of the feed-boxes 13 and the mechanism immediately in connection with it is most clearly shown in Figs. 2, 3, and 4. From inspection of these figures it should appear that each feed-box is formed above into a hopper 17 and a lower casing 18, which partially incloses and conforms to a certain degree with a feed-wheel 19, which is rotatably mounted within the same. This feed-wheel comprises a disk 20 and a cylindrical flange or face 21. On the inner side thereof are formed a plurality of small projections or teeth 22, which are instrumental in effecting the feeding of the seed in a manner which will be described more fully hereinafter. The aforesaid chute 14 is disposed just below this casing 18, to which it is integrally connected. As indicated, this chute comprises two downwardly-inclined branches 23 and 24, the former of which projects toward the front of the implement, while the latter projects toward the rear. These branches are preferably rectangular in section, as indicated. Near the lower extremity of the branch 23 it is provided on each side with a laterally-projecting flat lug or ear 25, and these ears are for the purpose of attaching the seed-tubes 15. To this end the upper extremities of the seed-tubes are provided with bell-mouths 26, which are of a width somewhat greater than the width of the branch 23, and each mouth is provided with a pair of oppositely-disposed openings 27. The upper edges of the mouth are provided with slots 28 of reduced dimension, which lead to the said openings. These slots 28 are adapted to pass the lugs 25 aforesaid when the seed-tube is applied in substantially the position in which it is shown in the dotted lines in Fig. 4. After the lugs have passed through the slots the seed-tubes may be then swung down into their normal position, whereupon the lugs will present their greatest width across the openings 27, so that the seed-tubes will be held in position against accidental removal. Ears 49 are fastened on at the openings 27 to prevent the seeds passing through.

The branch 24 of the aforesaid chute 14 is adapted to be used for broadcast sowing. Its extremity carries an extension 29, through which the seed is adapted to pass, so as to fall upon a scattering-plate 30 at the lower extremity of the extension, as shown.

Each of the casings 18 is provided with a laterally-projecting ear 31, upon which is pivotally mounted at 32 an arm 33, which arm comprises a substantially horizontal extension 34, which is disposed toward the feed-wheel 19 in the manner shown, its extremity 35 passing into the wheel from its open side, as will be readily understood. Its extremity 35 constitutes a shutter, one face of which is adapted to lie against a substantially flat face 36, constituting a part of the casing for the wheel 19. At a point substantially below the lower edge 37 of the shutter 35 the casing 18 terminates, as indicated at 38, and it should appear that the construction of the upper portion of the chute 14 at this point is such as to afford an opening 39 beyond the point 38, leading into the chute. It should be further understood that the casing completely incloses the wheel on its sides, so that if the feed-wheel 19 were driven in the direction of the arrow placed adjacent to it the seed could be carried by the wheel through the opening beneath the edge 37 of the shutter 35 in such a manner that the seed would be delivered immediately thereafter into the chute 14 through the opening 39. Evidently by raising or lowering this shutter the degree of opening could be directly controlled, effecting any desired change in the amount of seed passing through.

All the feed-wheels 19 are carried upon a common shaft 40, which, as indicated, is square in cross-section, and the hubs of the said wheels have square openings to receive the same. Arrangement is provided for driving this shaft 40 continuously while the implement is advancing. For this purpose the extremity of the shaft 40 is provided with a gear-wheel 41, which meshes with an idler 42, which idler is driven from a pinion 43, which pinion receives its rotation from one of the wheels 8, as will be readily understood. The directions of rotation of these gear-wheels are indicated, respectively, by the arrows adjacent to each of the wheels. In practice where the same implement would be used for sowing different kinds of seed it might be necessary in some cases to change the velocity of the rotation of the feed-wheels 19. This could of course be accomplished by replacing the gears 42 and 43 by smaller gears the diameters of which would bear a different ratio to each other.

For the purpose of shutting off either of the branches of the chute 14 when the other branch is the one being used each chute is provided with a deflector-plate 44, which plate may be of substantially the form shown and arranged to swing about the point 45, which is substantially beneath the meeting-point of the two branches 23 and 24 of the chute. This deflector-plate will occupy the position in which it is shown in Fig. 4 in full lines when the seeding is being effected by means of the seed-tubes 15. When in this position, it should appear that the deflector-plate effectually cuts off the forward branch 24 and deflects all the outgowing seed into the branch 23. This deflector-plate may assume the position in which it is shown in the dotted lines, when the condition of affairs is reversed, as will be readily understood. I provide small projections 46, which constitute stops against which the deflector-plate may rest in these two positions. All the deflector-plates 44 are carried upon a common shaft 47, which shaft is preferably square, as indicated, and received by square openings in the aforesaid plates.

The shaft 47 aforesaid affords opportunity for controlling all of the arms 33 aforesaid, this being effected by a longitudinal movement of the same, which longitudinal movement is permitted by loosely mounting the aforesaid deflector-plates 44 upon the shaft. For this purpose it should appear that the downward extension of each of the arms 33 is bifurcated, as indicated at 48. Between these bifurcated portions 48 there are provided collars 50, which are rigidly carried by the shaft 47, and these collars have peripheral recesses or grooves 51, in which lie the aforesaid bifurcated portions 48. From this arrangement it should appear that a longitudinal adjustment of the shaft 47 would effect simultaneously an adjustment of all the shutters 35. For the purpose of controlling the feed more intelligently an index-plate 52 is provided, which is preferably carried upon the aforesaid seedbox 10 upon its forward side. Coöperating with this index-plate there is a controlling-lever 53, which is pivoted at 54 to a bracket 55, which bracket is carried upon the under side of the seedbox 10, as indicated. This lever comprises a pointer 56, coöperating with the scales 57, which scales are graduated for different kinds of seed. The lower arm 58 of this lever is offset inwardly, so that its bifurcated extremity 59 lies around the aforesaid shaft 47, and a collar 62 is provided with a peripheral groove 60 similar to the aforesaid collars 50, which coöperates with the lever. From this arrangement the controlling-lever 53 may be adjusted into any desired position affecting at once all the shutters, as stated, and it may be locked in any desired position by means of a thumb-nut 76 running in the slot 77 in the index-plate.

In order to give access to the interior of the feed-box in case the feed-opening or feed-wheel becomes jammed by obstructions in the seed, I provide a cover or plate 65, the inner face of which rests against the disk portion of the feed-wheel 19, and this plate is removably held in position by suitable bolts 66, as indicated. This cover conforms, substantially, in outline to the shape of the feed-box where it is applied. It is provided near its upper edge on its inner side with a cheek 67 comprising a rounding and inclined face 68, adapted to deflect the incoming seed away from the wheel. It comprises also an arcuate surface 69, which is adapted to lie closely against the upper face 63 of the feed-wheel. At one side its vertical edge meets the face 69 so as to form a sharp angle 70, which substantially fills the angular space 64. In this manner the danger of clogging is averted. An inclined brace 71 is attached by a pivot-bolt 72 to the bottom 11 of the seed-box, the lower extremity 73 of which is adapted to abut against the outer face of the aforesaid cover-plate 65, resting upon the hub 74 of this plate in the manner shown. It should be understood that when the plate 65 is to be removed this brace is swung around, so as to permit such a removal.

In order to constrain the deflector-plates into either of their operative positions, the extremity of the shaft 47 is provided with a tumble-bob 75, which may be of substantially the form shown, consisting of a weight the center of gravity of which is adapted to lie on either side of a vertical line passing through the axis of the shaft 47 and above the same, as will be readily understood. From this arrangement its weight of course maintains the shaft 47 in either of its operative positions.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having thus described my invention, what I claim as new, and desire to secure by Letters Patent, is—

1. In an implement of the class described, in combination, a feed-box, a chute therebelow having branches, a deflector-plate mounted in said chute and adapted to substantially close either of said branches, a shaft adapted to slide through said deflector-plate and constituting an axle therefor, a member adapted to control the entrance of seed from said feed-box into said chute, and means for operating said member by the longitudinal movement of said shaft.

2. In an implement of the class described, in combination, a feed-box, a chute therebelow adapted to receive the seed therefrom, said chute having branches, a deflector-plate carried within said chute, a shaft passing through said deflector-plate and constituting means for rotating the same, a pivoted arm comprising a shutter adapted to control the delivery of seed from said feed-box into said chute, mechanism connecting said arm with said shaft, said shaft being adapted to slide longitudinally through said deflector-plate.

3. In an implement of the class described, in combination, a feed-box, a chute into which said feed-box is adapted to deliver the seed, a shutter adapted to control the delivery of said seed, said chute comprising branches, a shaft passing through said chute, a deflector-plate mounted thereupon and through which said shaft is adapted to slide, means for preventing relative rotation of said shaft and said deflector-plate, an arm rigid with said shutter, and a connection between said arm and said shaft for moving said shutter.

4. In an implement of the class described, in combination, a feed-box comprising a rotatably-mounted feed-wheel, a chute therebelow, means for continuously driving said wheel, a shutter coöperating with said feed-wheel and adapted to control the delivery of seed into said chute, said chute comprising branches, a shaft passing through said chute, a deflector-plate carried by said shaft within said chute and adapted to substantially close either of said branches, said shaft being adapted to transmit a rotary movement to said plate and being adapted to slide longitudinally through said plate, and means for transmitting the longitudinal movement of said shaft to said shutter.

5. In an implement of the class described, in combination, a feed-box, a feed-wheel mounted therein and having teeth on the inner face thereof, a shutter, the edge whereof coöperates with said inner face, means for rotating said feed-wheel to carry the seed from the opening below said shutter, a chute into which said seed may be delivered, said chute having branches respectively adapted to sow broadcast or drill the seed, a shaft passing through said chute, a deflector-plate mounted upon said shaft and adapted to be rotated thereby to close substantially either of said branches, said shaft being mounted to slide longitudinally through said deflector-plate, and means for transmitting the longitudinal movement of said shaft to said shutter.

6. In an implement of the class described, in combination, a plurality of feed-boxes, feed mechanism mounted therein, means for continuously driving said feed mechanism, a plurality of chutes below said feeding mechanism, said chutes having branches, deflector-plates carried within said chutes and adapted to close substantially said branches, a shaft passing through said chutes and upon which said deflector-plates are mounted, said deflector-plates permitting a longitudinal movement of said shaft, and mechanism actuated by a longitudinal movement of said shaft for controlling the delivery of seed to said chutes.

7. In an implement of the class described, in combination, a plurality of feed-boxes, feed mechanism carried therein, means for continuously driving the same, chutes below said feed-boxes and having branches, a shaft passing successively through said chutes, deflector-plates carried within said chutes and mounted upon said shaft, said shaft being adapted to transmit an angular movement to said deflector-plates and being adapted to move longitudinally therethrough, a plurality of shutters adapted to control the delivery of seed from said feed-boxes to said chutes, collars carried by said shaft, and a connection between said collars and said shutters.

8. In an implement of the class described, in combination, a plurality of feed-boxes, feeding mechanism carried therein, means for continuously driving said feeding mechanism, chutes below said feed-boxes and having branches, a shaft passing continuously through said chutes, deflector-plates carried within said chutes and mounted upon said shaft and adapted to substantially close said branches, said shaft being adapted to slide longitudinally through said deflector-plates, and the latter being non-rotatably engaged therewith, means for constraining said shaft into either of two extreme positions, a plurality of members adapted to control the feed from said feed-boxes to said chutes, a lever adapted to effect the longitudinal adjustment of said shaft, an index-plate coöperating with said lever, and a connection between said members and said shaft.

9. In an implement of the class described, in combination, a feed-box, a feed-wheel rotatably mounted therein and having projections on the inner face thereof adapted to effect a delivery of seed from said feed-box when said feed-wheel is rotated, and a removable cover-plate for said feed-box having a projection on the inner face thereof extending within the box and adapted for covering the upper outer face of said feed-wheel and forming a shield to support the seed and direct it over to one side of said wheel.

10. In an implement of the class described, in combination, a feed-box, a feed-wheel rotatably mounted therein and having projections on the inner face thereof adapted to effect a delivery of seed from said feed-box at substantially the lower portion thereof, and a removable cover-plate for said feed-box having a cheek on the inner face thereof adapted to overlie the outer upper face of said feed-wheel, said cheek having an inclined outer face adapted to deflect seed away from said wheel.

11. In an implement of the class described, in combination, a feed-box the upper portion whereof constitutes a hopper, a feed-wheel rotatably mounted in the lower portion of said feed-box and having projections on the inner face thereof to effect a delivery of seed from said feed-box, a cover-plate for said feed-box having a cheek upon the inner face thereof with a concave arcuate face adapted to lie adjacent to the upper outer face of said feed-wheel, said cheek being adapted to deflect seed toward the side of said wheel, and a pivoted brace, the free extremity whereof may abut said cover-plate to maintain the same in position.

12. In an implement of the class described, in combination, a seedbox, a feed-box therebelow, a rotatable feed-wheel mounted in said feed-box and having projections on the inner face thereof adapted to effect a delivery of seed from said feed-box, a cover-plate removably carried by said feed-box, said cover-plate having a cheek on the inner face thereof adapted to lie over the upper outer face of said feed-wheel, said cover-plate further having a boss on the outer face thereof, and a brace carried by said feed-box, the extremity whereof abuts the outer face of said cover-plate and rests against said boss.

In witness whereof I have hereunto set my hand in the presence of two witnesses.

ALBERT O'CONNOR.

Witnesses:
E. S. CLARRY,
R. M. CLOVER.